Patented Jan. 29, 1946

2,393,865

UNITED STATES PATENT OFFICE 2,393,865

STAIN REMOVING COMPOSITION

Helen E. Wassell, Pittsburgh, Pa., assignor to Carbide and Carbon Chemicals Corporation, a corporation of New York No Drawing. Application April 28, 1942,
Serial No. 440,873

16 Claims. (Cl. 252—105)

This invention relates to compositions for removing stains occasioned by ink or other staining materials.

The general class of compositions designated as "ink removers" or "stain removers" is well-known. Those most generally used are liquid compositions which are merely water solutions of materials which have a chemical action on the ink or stain.

The present invention is directed to improvements in the art relating to stain removers, the improvements being both in the chemical compositions of the stain removers and in their physical form. In accordance with the invention, I provide compositions which are very effective in removing stains when the compositions are activated merely by wetting with water. However, until activated, the preferred compositions are inert and do not dry out or deteriorate upon standing for long periods of time. The preferred compositions contain only water soluble materials and all ingredients are easily removed from a fabric after use, merely by washing with water. Furthermore, the compositions, even when activated, are substantially inert to all of the usual fabrics and to the coloring materials, for instance dyes, which are purposely applied to the fabrics for coloring purposes. The compositions are in solid form, preferably in the shape of sticks or rods, and when applied to a wet fabric do not materially spread beyond the area of application as do liquid stain removers. The sticks are both convenient and economical to use and may be carried without the danger of spilling, which is a distinct advantage over liquid stain removers. Other objects and features of the invention will be understood from the following, more detailed description.

The ink-remover stick comprises, as an essential ingredient, a solid polyethylene glycol of relatively high molecular weight. These compounds may also be referred to as polyoxyethylene glycols. They may be formed by the reaction of ethylene oxide with ethylene glycol in the presence of an alkaline catalyst, and with the degree of addition of the ethylene oxide controlled to produce the molecular size desired. For instance, ethylene oxide may be reacted with ethylene glycol or other alkylene glycol of low molecular weight, as a starting material, to give the polyethylene glycols. When the polyethylene glycols are referred to as having given molecular weights or average molecular weights, it is understood that the mass may be a mixture of polyethylene glycols of different molecular weights. For instance, ethylene glycol has a molecular weight, in round numbers, of 62 and each ethylene oxide radical has a molecular weight of 44. Polyethylene glycol composed of nineteen ethylene oxide radicals added to one ethylene glycol molecule has a molecular weight of 898. A polyethylene glycol having an average molecular weight of 900 may thus be a mixture of polyethylene glycols wherein, for instance, there may be some polyethylene glycol molecules containing eighteen or less, and some containing twenty or more, ethylene oxide radicals, but the molecular weight or the average molecular weight of the mass as determined by test is about 900. Polyethylene glycols having an average molecular weight of about 900 are normally solid, having a fusion or melting point of about 35° C. to 37° C. For the purposes of this invention, I use a polyglycol composition of the type disclosed herein, containing sufficient oxyethylene radicals to form a normally solid polyethylene glycol, and polyethylene glycol compositions having an average molecular weight of at least 900 are preferred.

The polyethylene glycols having the higher average molecular weights are, at normal temperatures, harder than those of the lower average molecular weights and have higher melting points. For example, a polyethylene glycol having an average molecular weight of approximately 900 (as determined by the Menzies and Wright method of determining molecular weights, described at page 2314, volume 43 (1921) of the Journal of the American Chemical Society) has a density of approximately 1.152 at 20° C., a melting point of approximately 35° C. to 37° C., a viscosity of 78 Saybolt Universal seconds at 210° F. and a flash point of 430° F. A polyethylene glycol having an average molecular weight of approximately 3,500 (as determined by the same method), has a density of approximately 1.203, a melting point of approximately 50° C. to 53° C., a viscosity of 418 and a flash point of 535° F., in the units previously stated. A polyethylene glycol having an average molecular weight of approximately 6,000 has a melting point of about 60° C. to 65° C. The liquid polyalkylene glycols have average molecular weights beginning in the neighborhood of 200 and running up to about 500 when they begin to assume the consistency of the 900 molecular weight material previously described. For the purpose of this disclosure the term "polyethylene glycol" is intended to include any and all of the modifications indicated; and the term "solid" is intended to include materials which are semi-solid and will hold their shape at normal room temperatures of from approximately 20° C. to 35° C. as distinguished from those which are distinctly liquids and incapable of holding a given shape at normal room temperatures. In the compositions of the present invention, the solid polyethylene glycols are essential ingredients but those which are liquids may be combined therewith, for instance to soften the solid materials.

All of these polyethylene glycols may be prepared substantially free from odor and have the property of forming clear, colorless and stable water solutions. The polyethylene glycols which have average molecular weights of approximately 900 to 2,500 are almost immediately dissolved in water when rubbed therewith between the fingers and those having higher average molecular weights are dissolved somewhat like hard soaps. However, the polyethylene glycols are completely soluble in water and the solutions are clear as distinguished from the colloidal solutions which have the opalescent effect produced by soaps. Except in special instances hereinafter referred to, where the liquid polyethylene glycols are used, I prefer to use the polyethylene glycols having average molecular weights between about 900 and about 6,000, as it has been found that these materials will form sticks which are sufficiently solid for the purposes of this invention yet can be wetted with water sufficiently easily and quickly to allow the stain remover to be applied to a stained fabric without undue delay.

While the above-described polyethylene glycols appear to be substantially inactive with respect to those dyes or other coloring materials which are substantially unaffected by water, they appear to have a mild action in removing ink stains. This action is possibly due to the different manners in which those dyes which are purposely used to color fabric, as contrasted with ink, are retained on the fabric. When a fabric is purposely colored, the coloring material is either applied to or developed on the fabric, usually at an elevated temperature at or near the boiling point of water; and in almost every case the fabric is given a treatment, after the coloring material is applied, to make the color "fast." On the other hand, when ink or other staining material gets onto a fabric at room temperature and there is no after-treatment of the fabric to set the color, the stain is somewhat superficial. When used alone (save for water), that is, without the addition of other chemicals, the action of the above-described polyethylene glycols, appears to be that of a release agent which releases the stain from the fabric.

With the polyethylene glycols, I prefer, however, to use one or more materials which have a chemical action in solubilizing the ink or discoloring it, or both. These materials may be alkylol amines, exemplified by mono, di or triethanol-amine, mildly acidic materials exemplified by glyoxal and oxalic acid, and reducing materials exemplified by the sodium sulfites, including the acid-, the hypo-, and the hydro-sulfites. Citric acid, tartaric acid and malonic acid may be used as acidic materials, the acids given representing the low and the high molecular weight organic acids and organic acids having two and three carboxyl groups. These acids and their salts or other compounds will contain the corresponding carbonyl groups. Sodium carbonate or sodium acid carbonate or similar salts, or chloride of lime, or other halides as sodium or tin chloride, or cream of tartar, or alum, or potassium or sodium cyanides, or potassium or sodium nitrates, or the hypochlorites, are examples of materials which may be used in their respective classes or as special stain removers. In case acids are used, they are preferably non-volatile at ordinary temperatures and organic acids are preferred since they generally do not affect fabrics and especially cotton fabrics, as do the stronger inorganic acids. Oxalic acid is one of the strongest organic acids, yet it will not harm fabrics if it is removed from the fabric by rinsing the fabric with water after the stain has been removed; and being a relatively strong acid, it produces better reducing action of sodium bisulfite when the bisulfite is later applied to the stain. Furthermore, oxalic acid is an effective agent for solubilizing and removing staining materials which contain iron, for instance the iron salts which occur in many inks and the iron oxides which give rust stains. In case a relatively strong acid, for instance oxalic acid, is an ingredient of the ink remover, I find that it is desirable, wherever possible, to use the ingredient in the form of an acidic salt in combination with the polyethylene glycols; for instance I prefer to use triethanolamine acid oxalate instead of oxalic acid. I find that very efficacious ink removers may be prepared for general use by incorporating with the polyethylene glycol, an alkylol amine and an organic acid, the amine and acid being in such proportions that substantially an acid salt is prepared having only one free or unneutralized carboxyl group; for instance triethanolamine and oxalic acid may be used in equimolar ratios to give substantially triethanolamine acid oxalate.

When the previously described materials are used in combination with the polyethylene glycols, particularly efficacious ink removers are formed. The polyethylene glycol may exert a coupling action between the chemical and the ink or stain. In any event, I have found that combined and simultaneous action of the polyethylene glycol and the chemical is more effective in removing the ink than the action of either ingredient alone or the action of one applied subsequently to the other.

For the most effective use of the ink removing sticks comprising the polyethylene glycols and the added chemicals (which may broadly be referred to as "addends"), I prefer to prepare two types of sticks, one stick comprising the polyethylene glycol and the acidic addend and the second stick comprising the polyethylene glycol and the basic and reducing addend.

For the purpose of illustrating the foregoing and later description of my invention, reference may be had to the following formulae of ink and stain removing sticks adapted for general use. It is to be understood, however, that these examples are merely by way of illustrating the invention and not for the purpose of limiting the invention to the specific formulae disclosed, particularly as the addends which may be included, either alone or in combination with other addends, are more numerous than those given in the examples or elsewhere in this description.

*Example A*

A stick of type #1 may comprise 60 parts (all parts in these examples being given by weight) of polyethylene glycol having an average molecular weight of 3,500, 21.5 parts of triethanolamine and 18.5 parts of hydrated oxalic acid containing two molecules of water. The amine and the acid may be reacted prior to incorporation with the polyethylene glycol to form a salt which is substantially mono (triethanol ammonium) oxalate or triethanol ammonium acid oxalate.

Example B

Another stick of type #1 may comprise 50.6 parts of the polyethylene glycol of Example A, 19.2 parts of citric acid and 14.2 parts of triethanolamine. The amine and the acid may be reacted prior to incorporation with the polyethylene glycol, to form a salt, which is substantially mono (triethanol ammonium) citrate if the proportions of acid and amine given in the example are used.

Example C

Instead of using the proportions of citric acid and triethanolamine given in Example B or the corresponding amount of a mono (triethanol ammonium) citrate, I may use 50.6 parts of the said polyethylene glycol and 49.4 parts of a di (triethanol ammonium) citrate or the proper proportions of amine and acid to give the di-citrate. This citrate may be formed by reacting 19.2 parts of citric acid with substantially 28.4 parts of triethanolamine.

Example D

Another stick of type #1 may comprise 60 parts of the polyethylene glycol of Example A and 40 parts of glyoxal.

The polyethylene glycol appears to assist or activate the addend in its stain removing action, and I have found that when using the polyethylene glycols with addends to prepare sticks of type #1, it is well to have the materials acidic but only mildly so. The organic amines and more particularly the alkylol amines appear to buffer the reactions and provide favorable conditions for the chemical reactions involved in removing the stain. I therefore prefer, in preparing an ink removing composition for general use, to have only one free or unneutralized carboxyl group per molecule of organic acid and to have present an alkylol amine with a polyethylene glycol. Thus, where oxalic acid is used in the ink remover, I prefer to use in conjunction therewith, approximately 1 mol of alkylol amine per mol of oxalic acid. Likewise, where citric acid is used, I prefer to use two mols of alkylol amine per mol of citric acid. These proportions leave one free or unneutralized carboxyl group in each molecule of acid. Thus the composition is slightly acidic yet not so acidic that it attacks the fabric or the dye nor are the acidic properties completely neutralized as would be the case where only a normal salt, for instance trisodium citrate or disodium oxalate, is used. However, this rule does not have to be followed strictly, for instance in the case of stain-removing compositions for use in commercial cleaning establishments. In such cases, the work is done by experienced operators who carefully note the effects of the compositions and it is desirable to remove the stains as quickly as possible. Commercial establishments may have a large variety of the stain removing sticks of graduated acidity or carrying addends which are especially effective on particular stains. The compositions given in the preceding and succeeding examples are effective for substantially all of the common stains.

Example E

A stick of type #2 may comprise 75 parts of the polyethylene glycol of Example A and 25 parts of powdered sodium bisulfite or other basic or reducing material as previously described.

The polyethylene glycol previously described, which has an average molecular weight of 3,500, is slightly harder than the usual paraffin wax, at a temperature of approximately 20° C. The sticks which are formed have substantially this hardness in the case where the addends are solids, and are softened rather slowly by water which has the temperature of the usual tap water, that is if the end of a stick be dipped in water, the stick is softened to approximately the same extent as a hard soap. A stick which is softer and more readily softened by water may be prepared by using a polyethylene glycol which has a lower molecular weight, for instance an average molecular weight of 900. Also, a softer stick may be prepared by including in the mass, a few per cent of water or other liquid (for instance, a liquid polyalkylene glycol) which is compatible with the other ingredients. I have found that the alkyl ethers of diethylene glycol are admirably suited for this purpose as they are water soluble and do not affect the dye in the fabric although they assist the other ingredients in removing ink. Diethylene glycol monoethyl ether, which is a liquid, and its homologues, for instance the diethylene glycol methyl ether and the butyl ether may be used. Under the conditions of use, these ethers are substantially non-volatile. By the use of a liquid polyethylene glycol instead of water to soften a composition containing a hard polyethylene glycol, I am enabled to obtain a softer composition and also obtain the benefits of having present the added amount of polyethylene glycol.

Example F

A stick of type #2 may comprise 70 parts of the polyethylene glycol of Example A, 25 parts of powdered sodium bisulfite and 5 parts of diethylene glycol monoethyl ether. This stick is softer than that of Example E and is more easily softened with water. The alkyl ethers of diethylene glycol are solvents for the polyethylene glycols, and it is found that they assist the other ingredients of the stick in removing the ink. The compositions of Examples A through D may also include a softening agent, preferably one or more of the said ethers. The liquid polyethylene glycols may be used to replace a part or all of the said ethers as softening agents.

In making the sticks, the polyethylene glycol is merely melted and the addends incorporated with uniform distribution, for instance by means of any suitable mixing apparatus. The addends are preferably soluble in the polyethylene glycols although not necessarily so. Those addends which are liquids have a tendency to form a softer stick than do those which are solids and it therefore may be desirable, when using liquid addends, to use a harder polyethylene glycol, for example one of higher molecular weight, for instance a polyethylene glycol having an average molecular weight of about 6,000.

When the polyethylene glycol and the addends have been thoroughly mixed, sticks may be formed by pouring the fluid mass into molds and permitting the mass to solidify. Sticks may also be molded by pressure when the mass has reached the plastic condition. The sticks may be packaged by wrapping in metal foil or other material which is not affected by water. In using the sticks, the covering is torn away at one end to expose only so much of the stick as is necessary for use, leaving the majority of the stick protected so that it will not be dissolved when dipped into water.

For removing ink spots or other stains the following procedure may be used. Lay the spotted fabric on a clean cloth (under-cloth) with the right side of the fabric on the under-cloth. It is usually desirable, but not necessary, first to remove as much of the ink as is possible with pure water. To do this, use another small clean cloth or a sponge or the like, to apply water to the spot, with a daubing action, until no more color from the ink spot can be removed onto the under-cloth. The water will, of course, wet an area larger than the spot. Then apply the end of the ink removing stick to the ink spot. This will release more ink but there is little tendency for the material from the stick to spread beyond the area to which the stick is directly applied. The water on the fabric dissolves a portion of the stick and forms a rather concentrated solution on the ink spot. Depending upon the hardness of the stick and the ease with which the materials are taken up by the wet fabric, it may be desirable to wet the end of the stick prior to applying it to the ink spot. Also, it may be desirable to press the stick against the fabric with a daubing action to force the material through the fabric so that intimate contact between the composition and the under-surface of the fabric, is obtained.

The stick may be applied to both sides of the fabric and, when wet, may be applied to the ink spot without previous wetting of the fabric.

The stick is applied to the fabric repeatedly until no more color comes from the ink spot onto the undercloth. Preferably, the end of the stick is wetted before each application. When no more color appears on the undercloth, the fabric is washed or rinsed by daubing the spot with a small sponge or cloth, wet with water.

In using the ink removing sticks, it is preferable to apply first a stick of type #1, then rinse the spot and thereafter, if the ink has not entirely disappeared from the fabric, apply a stick of type #2 followed by a final rinsing, all in the manner previously described.

For removing ink and other stains from the hands, the hands may be wet with water and the sticks applied to the stain. Merely rinsing the hands with water after the stick has been applied properly, will remove the composition. The polyethylene glycols do not dissolve the oils from the skin; and both the polyethylene glycols and the alkyl ethers of diethylene glycol are skin emollients. My stain removing compositions therefore have less undesirable effect on the skin than do preparations comprising the usual stain solvents.

Where desired, my compositions may include quantities of liquids greater than those given in the previous examples, thus forming fluent compositions or creams instead of sticks. When using the fluent compositions, particularly those containing water, it should be recognized that the compositions do not require the fabric or hands to be wetted to the extent required by the harder sticks for successful use. Thus when the creams are used on fabrics, the fabric is preferably merely damp at the time the cream is applied. When the creams are applied to stains on the hands, the hands are preferably not previously rinsed with water or solvent.

The ink remover sticks or creams may, if desired, carry other materials, for instance fillers or adulterants such as soaps, and the like. These are not recommended, however, as they usually decrease the efficiency of the ink remover and frequently leave a deposit on the fabric. The preferred sticks contain only water soluble materials which leave no insoluble deposit at the spot where the ink remover is applied. In the case of compositions intended to be applied to the hands, however, it may be desirable to include a fine abradant; for instance up to about 10% of the composition may be diatomaceous earth.

The compositions herein described will remove stains other than ink, for instance stains from coffee, tea, iodine, grass, rust, and the like. The sticks and creams are very convenient and economical to use. The sticks and creams do not deteriorate nor do the ingredients used in the compositions become water-insoluble or inactive when left standing over long periods of time.

I claim:

1. A solid composition of matter effective, in conjunction with water, in removing color stains, said composition comprising a solid polyethylene glycol having an average molecular weight of at least 900 and a water-soluble color stain-removing ingredient having a chemical action and a solubilizing action on said stains and operating in conjunction with said glycol and water to remove said stains.

2. A solid composition of matter effective, in conjunction with water, in removing color stains, said composition comprising a solid polyethylene glycol having an average molecular weight of at least 900 and a water-soluble color stain-removing ingredient having an acidic action and a solubilizing chemical action on said stains and operating in conjunction with said glycol and water to remove said stains.

3. A solid composition of matter effective, in conjunction with water, in removing color stains, said composition comprising a solid polyethylene glycol having an average molecular weight of at least 900 and a water-soluble color stain-removing ingredient comprising an organic acid having a chemical action and a solubilizing action on said stains and operating in conjunction with said glycol and water to remove said stains.

4. A solid composition of matter effective, in conjunction with water, in removing color stains, said composition comprising a solid polyethylene glycol having an average molecular weight of at least 900 and a water-soluble color stain-removing ingredient comprising a weak organic acid of the group consisting of citric acid, tartaric acid and oxalic acid having a chemical action and a solubilizing action on said stains and operating in conjunction with said glycol and water to remove said stains.

5. A solid composition of matter effective, in conjunction with water, in removing color stains, said composition comprising a solid polyethylene glycol having an average molecular weight of at least 900 and a water-soluble color stain-removing ingredient comprising an organic acid having only one free carboxyl group and having a solubilizing chemical action on said stains and operating in conjunction with said glycol and water to remove said stains.

6. A solid composition of matter effective, in conjunction with water, in removing color stains, said composition comprising a solid polyethylene glycol having an average molecular weight of at least 900 and a water-soluble color stain-removing ingredient comprising an acidic salt having a chemical action and a solubilizing action on said stains and operating in conjunction with said glycol and water to remove said stains.

7. A solid composition of matter effective, in conjunction with water, in removing color stains, said composition comprising a solid polyethylene glycol having an average molecular weight of at least 900 and a water-soluble color stain-removing ingredient comprising an acidic ammonium salt having a chemical action and a solubilizing action on said stains and operating in conjunction with said glycol and water to remove said stains.

8. A solid composition of matter effective, in conjunction with water, in removing color stains, said composition comprising a solid polyethylene glycol having an average molecular weight of at least 900 and a water-soluble color stain-removing ingredient comprising an ammonium compound having a chemical action and a solubilizing action on said stains and operating in conjunction with said glycol and water to remove said stains.

9. A solid composition of matter effective, in conjunction with water, in removing color stains, said composition comprising solid polyethylene glycol having an average molecular weight of at least 900 and a water-soluble color stain-removing ingredient comprising an acid sulfite of an alkali metal having a chemical reducing action and a solubilizing action on said stains and operating in conjunction with said glycol and water to remove said stains.

10. A solid composition of matter effective, in conjunction with water, in removing color stains, said composition comprising a solid polyethylene glycol having an average molecular weight of at least 900 and a water-soluble color stain-removing ingredient comprising a reducing agent having a chemical reducing action and a solubilizing action on said stains and operating in conjunction with said glycol and water to remove said stains.

11. A solid composition of matter effective, in conjunction with water, in removing color stains, said composition comprising a solid polyethylene glycol having an average molecular weight of at least 900 and a water-soluble color stain-removing ingredient comprising an acidic alkylol amine salt having a chemical action and a solubilizing action on said stains and operating in conjunction with said glycol and water to remove said stains.

12. A solid composition of matter effective, in conjunction with water, in removing color stains, said composition comprising a solid polyethylene glycol having an average molecular weight of at least 900 and a water-soluble color stain-removing ingredient comprising an alkylol amine acid salt of an acid of the group consisting of citric acid, tartaric acid and oxalic acid having a chemical action and a solubilizing action on said stains and operating in conjunction with said glycol and water to remove said stains.

13. A solid composition of matter adapted, in conjunction with water, to remove color stains, said composition comprising a solid polyethylene glycol having an average molecular weight of at least 900, a stain removing ingredient comprising an alkylol amine acid salt of an organic acid, and an alkyl ether of diethylene glycol.

14. A solid composition of matter adapted, in conjunction with water, to remove color stains, said composition comprising a solid polyethylene glycol having an average molecular weight between about 900 and about 6,000, triethanolamine acid oxalate, and diethylene glycol monoethyl ether.

15. A solid composition of matter adapted, in conjunction with water, to remove color stains, said composition comprising a solid polyethylene glycol having an average molecular weight between about 900 and about 6,000, a reducing agent having a chemical action on the stain, and diethylene glycol monoethyl ether.

16. Method of removing color stains from fabrics which comprises wetting the area of the stain with water, applying to the wet stain a composition comprising a normally solid polyethylene glycol having an average molecular weight above about 900, and an ethanolamine acid oxalate, and thereafter applying a composition comprising a normally solid polyethylene glycol having an average molecular weight above about 900 and a reducing agent.

HELEN E. WASSELL.